(12) United States Patent
Stonier

(10) Patent No.: US 7,874,679 B2
(45) Date of Patent: Jan. 25, 2011

(54) IMAGING APPARATUS

(75) Inventor: Christopher Simon Stonier, Ashley Heath (GB)

(73) Assignee: Domestic Fire Appliances Limited, Market Drayton (GB)

(*) Notice: Subject to any disclaimer, the term of this patent is extended or adjusted under 35 U.S.C. 154(b) by 740 days.

(21) Appl. No.: 11/720,734

(22) PCT Filed: Dec. 2, 2005

(86) PCT No.: PCT/GB2005/004610

§ 371 (c)(1),
(2), (4) Date: Nov. 15, 2007

(87) PCT Pub. No.: WO2006/059116

PCT Pub. Date: Jun. 8, 2006

(65) Prior Publication Data

US 2008/0252969 A1   Oct. 16, 2008

(30) Foreign Application Priority Data

Dec. 3, 2004   (GB) .................................. 0426502.1

(51) Int. Cl.
*G03B 21/14* (2006.01)
(52) U.S. Cl. .................... 353/10; 353/74; 359/478
(58) Field of Classification Search ............... 353/74, 353/77, 78, 79, 98, 99, 10, 28; 359/478, 359/457, 458
See application file for complete search history.

(56) References Cited

U.S. PATENT DOCUMENTS

| | | | | |
|---|---|---|---|---|
| 6,233,024 B1 * | 5/2001 | Hiller et al. | .................. | 348/744 |
| 6,364,490 B1 * | 4/2002 | Krause | ........................ | 353/77 |
| 6,926,412 B2 * | 8/2005 | Kim et al. | ..................... | 353/94 |
| 6,994,437 B2 * | 2/2006 | Suzuki et al. | ................. | 353/77 |
| 7,562,983 B2 * | 7/2009 | Kim et al. | ..................... | 353/10 |
| 2004/0252284 A1 * | 12/2004 | Suzuki et al. | ................. | 353/77 |

FOREIGN PATENT DOCUMENTS

| | | |
|---|---|---|
| EP | 0999464 | 5/2000 |
| GB | 1266131 | 3/1972 |
| GB | 2222000 A | 2/1990 |
| GB | 2264555 A | 9/1993 |
| GB | 2288052 | 10/1995 |
| GB | 2350670 | 12/2000 |
| GB | 2391614 | 2/2004 |
| JP | 2002123206 | 4/2002 |

* cited by examiner

*Primary Examiner*—William C Dowling
(74) *Attorney, Agent, or Firm*—Chernoff, Vilhauer, McClung & Stenzel

(57) ABSTRACT

Imaging apparatus including image creation means for creating a moving image, means for enlarging the image, and a screen on which the image is displayed in use to a viewer. The image creation means includes a substantially planar image creation screen on which the image is created.

5 Claims, 5 Drawing Sheets

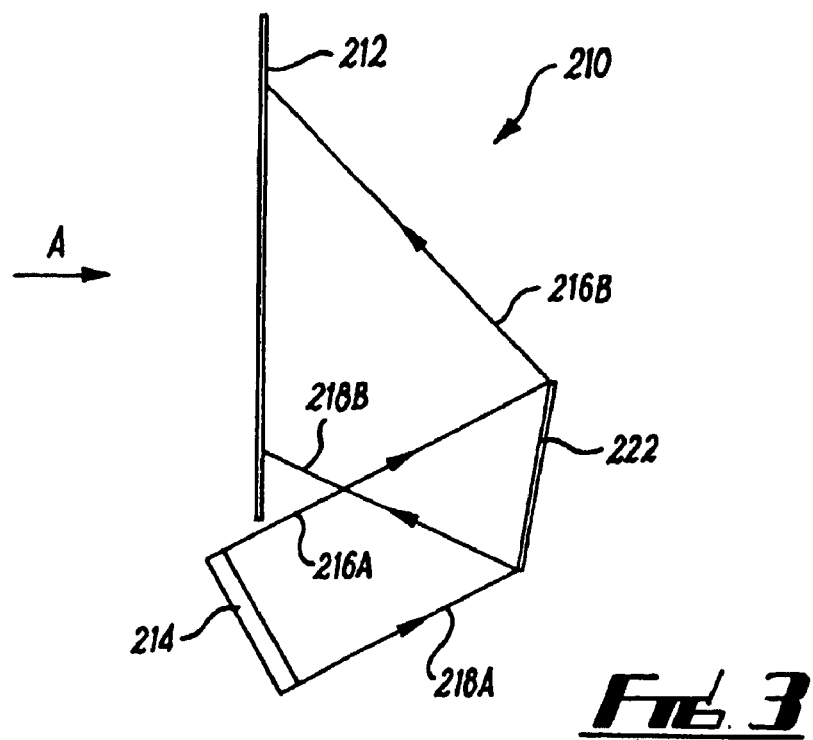
FIG. 3
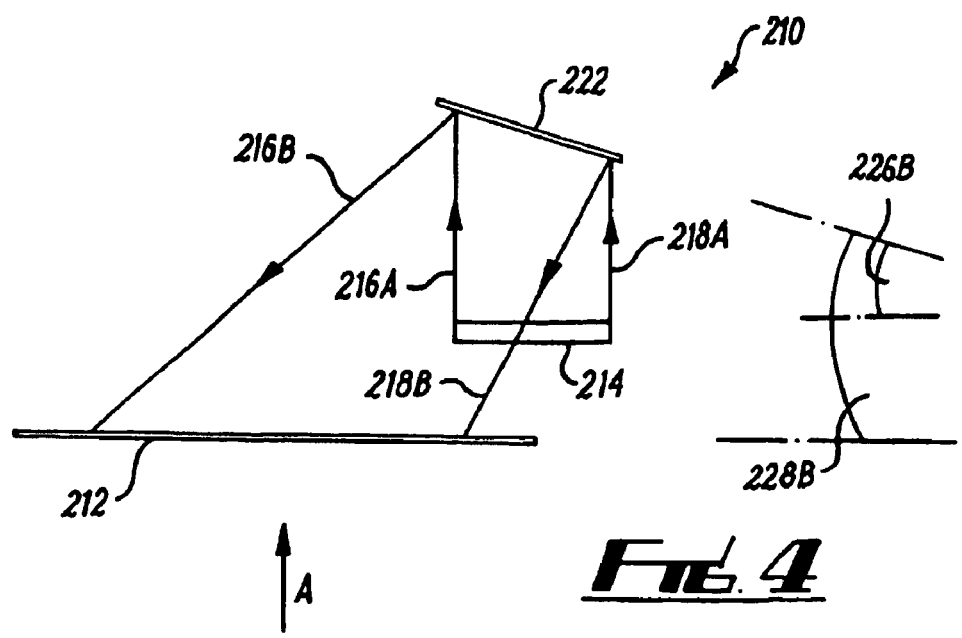
FIG. 4

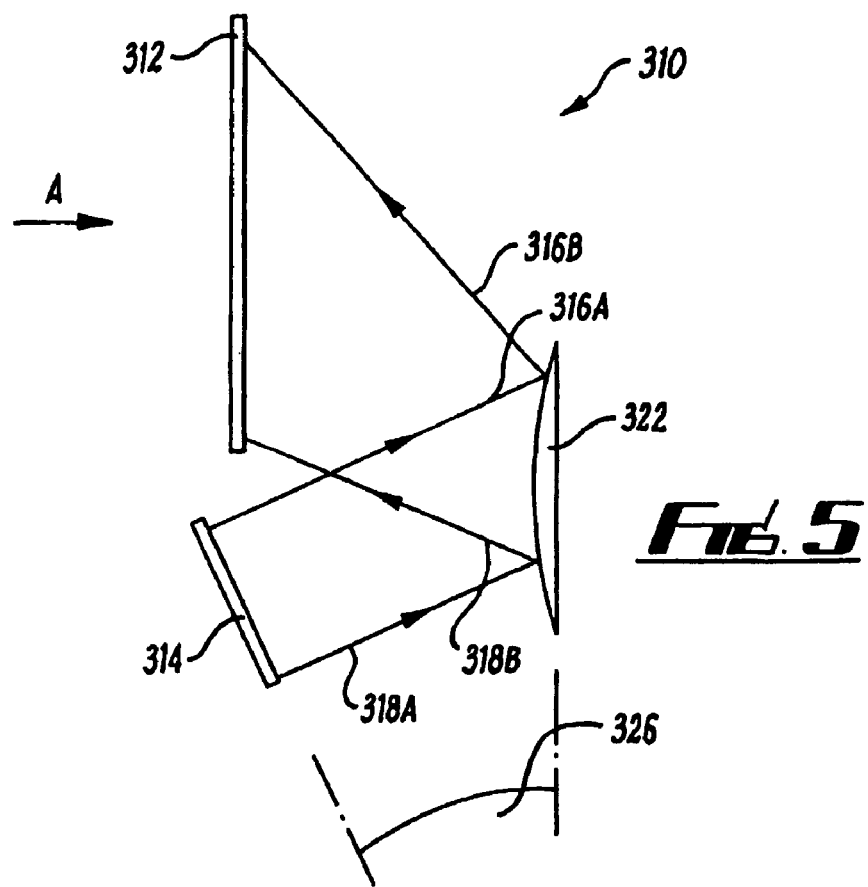
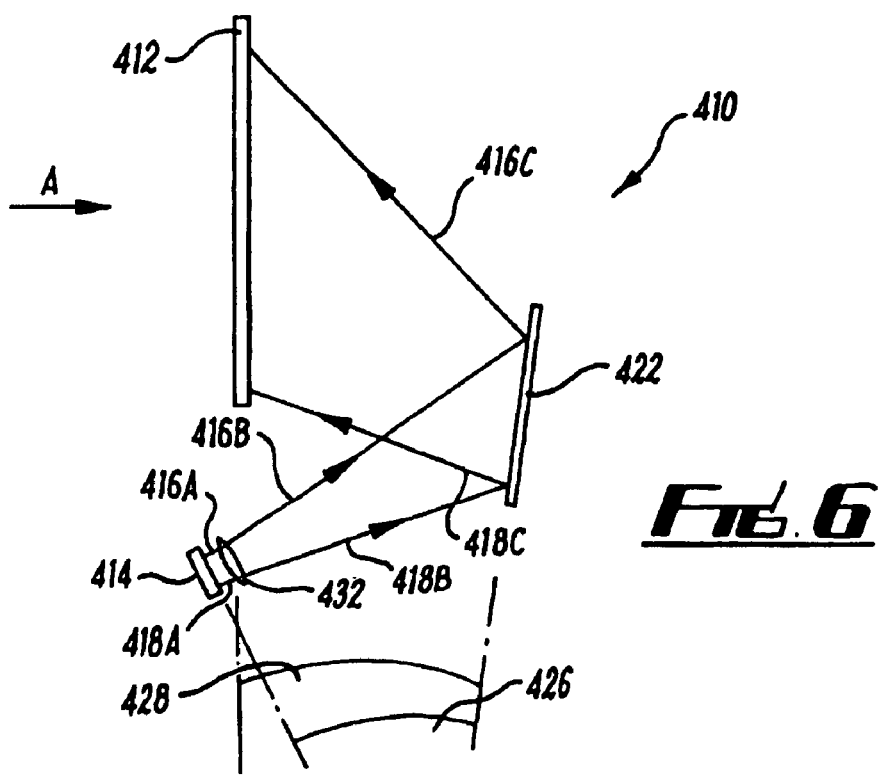

IMAGING APPARATUS

The present invention relates to imaging apparatus, and particularly, but not exclusively, to imaging apparatus for use in heating appliances such as domestic fires. The present invention further relates to heating appliances including imaging apparatus.

In the field of electric fires, a number of arrangements are known which attempt to simulate aspects of the appearance of open fires such as glowing coal or flickering flames. In one known arrangement, a translucent surface is illuminated from behind to give the appearance of glowing coals or embers. The illumination can be varied to simulate a glowing effect. While providing the effect of glowing coals or embers, such arrangements do not effectively simulate the appearance of moving flames. In another arrangement, textile material is mounted in an air flow and illuminated by a plurality of coloured lights to simulate a moving flame. However, such arrangements require the provision of a fan or similar apparatus, are relatively noisy, and are space consuming.

According to the present invention there is provided imaging apparatus for a heating appliance, the imaging apparatus including image creation means for creating an image, means for enlarging the image, and a screen on which the image is displayed in use to a viewer.

The image creation means may Include a substantially planar image creation screen on which the image is created, which may be in the form of a liquid crystal display (LCD) screen. Alternatively the image creation screen may be a cathode ray tube (CRT) screen or a plasma screen. As a further alternative, the image creation means may include a projector.

The enlarging means may be provided by the orientation of the image creation screen relative to the display screen. The image creation screen may be orientated at a first angle relative to the display screen. The first angle may be greater than 0° and less than 90°.

The apparatus may include a reflector, which may be positioned to reflect the image on to the display screen. The enlarging means may be provided by the orientation of the image creation screen relative to the reflector. The image creation screen may be orientated at a second angle relative to the reflector. The second angle may be greater than 0° and less than 90°.

The enlarging means may be provided by the orientation of the reflector relative to the display screen. The reflector may be orientated at a third angle relative to the display screen. The third angle may be greater than 0° and less than 90°.

The reflector may include a curved surface, which may produce an enlarged image at the display screen, and thus form the enlarging means. Preferably the curved surface is convex.

The reflector may be in the form of a mirror.

The image creation screen may comprise the display screen. The enlarging means may include a lens arrangement, which may include at least one lens.

The or each lens may be in the form of a Fresnel lens. The or each Fresnel lens may be curved when viewed in plan in use, and may be curved concavely relative to the image creation means.

Preferably, the or each curved lens forms an arc in plan in use which subtends an angle between of between 60° and 100°, and more preferably of between 80° and 95°, and optimally of approximately 90°.

Preferably, the lens arrangement is arranged so that the image seen by the viewer is a virtual image.

Preferably, the lens arrangement has the effect of a converging lens.

Preferably, the lens arrangement has an effective focal length that is greater than the distance between the lens arrangement and the image creation means.

The image creation means may include a controller, which may be programmable, and may be programmable with a set of instructions. The image creation means may include storage means, for storing the set of instructions. The storage means may include optical storage means, which may be in the form of CD ROMs, DVDs, EPROM, flash or RAM memory.

The controller may include communication means to enable a user to alter the set of instructions. The communication means may include a port such as a USB port.

The apparatus may include odour producing means, which may Include a container for receiving an odour producing material and means for heating the odour producing material.

The image may be a moving image, and may simulate a moving flame.

Further according to the present invention, there is provided a fire, the fire including imaging apparatus as set out above.

Embodiments of the present invention will now be described, by way of example only, and with reference to the accompanying drawings, in which:

FIG. 3 is a diagrammatic side view of a third embodiment of the invention;

FIG. 4 is a diagrammatic view from above of the embodiment shown in FIG. 3;

FIG. 5 is a diagrammatic side view of a fourth embodiment of the invention;

FIG. 6 is a diagrammatic side view of a fifth embodiment of the invention;

Figure 1:
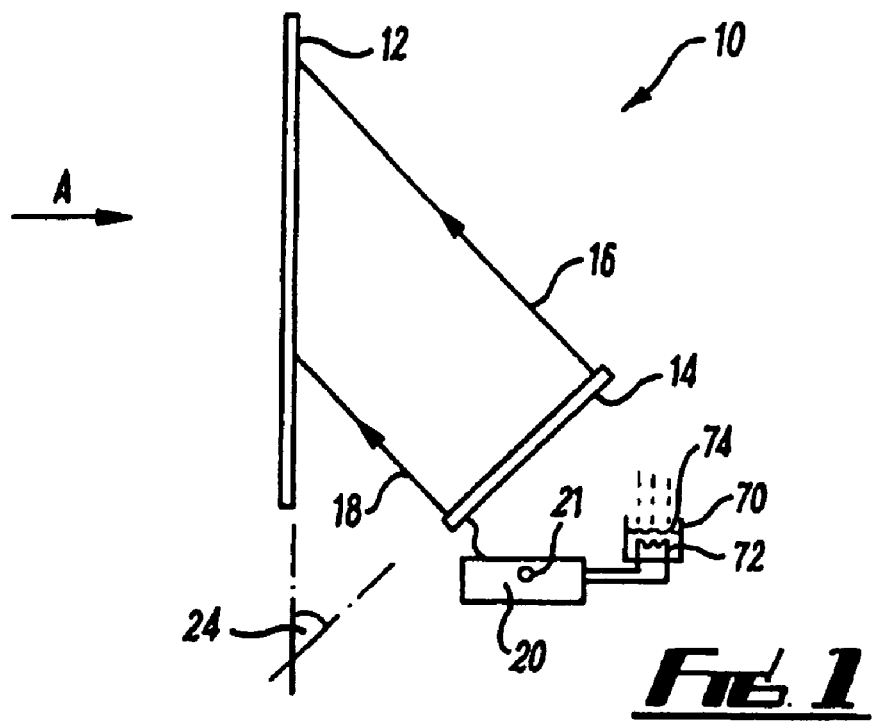
FIG. 1 is a diagrammatic side view of a first embodiment of the invention.

FIG. 1 shows a diagrammatic side view of a first embodiment of the invention. Imaging apparatus 10 includes a substantially planar display screen 12 and moving image creation means in the form of a substantially planar liquid crystal display (LCD) screen 14. The LCD screen 14 is in communication with a programmable controller 20, which is programmable with a set of instructions for creating the moving image. The programmable controller 20 includes storage means (not shown) for storing the set of instructions. The storage means could include, for example, optical storage means such as digital video discs (DVDs), CD ROMs and/or EPROM memory.

The controller 20 includes communication means In the form of a communications port 21 to enable a user to alter the set of instructions. The part 21 could be a USB port. The set of instructions could include application instructions and data instructions. The communication means permits the user to load new data instructions to the controller 20 to change the Image. In one example, the controller 20 could be linked to the Internet via the communications port 21 and new data instructions in the form of an Image file could be downloaded from the Internet to the controller 20 via the communications port 21. Thus, In one example in which the moving image Is of flames, new image files could be downloaded to vary the image created at the LCD screen 14.

The image files could comprise a plurality of still images, and the application instructions could be arranged to select sequences of still images to product the moving image. The sequences could be random or could be in a predetermined order or pattern. Thus a relatively small number of still images, taking up a relatively small amount of storage memory, can be arranged to produce a varying and/or randomised moving image, allowing the size of the controller 20 to be minimised. For example, a video clip lasting three seconds could contain seventy five still frames, which could be selected randomly or in a varying and/or predetermined order to produce a moving image.

In a further example, conversion means could be provided to convert image files provided by a user to image files suitable for use by the controller 20. The conversion means could include conversion instructions, which could be provided at the controller 20 or at a website.

In one particular example, the programmable controller and LCD screen could be combined in the form of a portable DVD player.

The programmable controller 20 and LCD screen 14 are arranged so that a moving image is created on the screen 14. The image is projected from the screen 14 onto the display screen 12 as indicated by arrowed lines 16, 18, for viewing by a viewer positioned in front of the display screen 12 along the direction indicated by arrow A.

The LCD screen 14 is orientated at a first angle 24 relative to the display screen 12, so that the image at the display screen 12 viewed by the viewer is enlarged relative to the Image created at the screen 14, the orientation of the LCD screen 14 and the display screen 12 thus forming image enlarging means.

The first angle of orientation 24 between the display screen 12 and the LCD display screen 14 can be varied to vary the degree of enlargement of the image. When the first angle 24 is very small, so that the LCD screen 14 and the display screen 12 are substantially parallel, the degree of enlargement is correspondingly very small, the image at the display screen 12 being similar in size to the image at the LCD screen 14. As the first angle 24 is increased, the degree of enlargement is correspondingly increased, although the image quality is reduced as the first angle 24 increases. The first angle 24 must be greater than 0° and less than 90° to effect enlargement.

In a particular application of the imaging apparatus 10, the apparatus 10 is incorporated in a fire to produce an image of a moving flame in the fire, which could be, for example, an electric fire. The display screen 12 could be positioned, for instance, behind fuel effect members, which could have the appearance of pieces of coal, logs, embers or pebbles. In this particular application, it is advantageous that the screen LCD 14 is relatively small and compact to reduce the overall size of the fire, while the degree of definition of the image is relatively unimportant. Thus a relatively large first angle 24 of, say, more than 45° can be utilised to provide a relatively high degree of enlargement.

The controller 20 Includes odour producing means comprising a container 70 in which is receivable an odour producing material 74 such as an essential oil. A means for heating the odour producing material 74 is provided in the form of a heating element 72, which is selectively operable. In use, the heating element 72 heats the odour producing material 74 to release odours. The odour producing material 74 can be chosen by the user.

Figure 2:
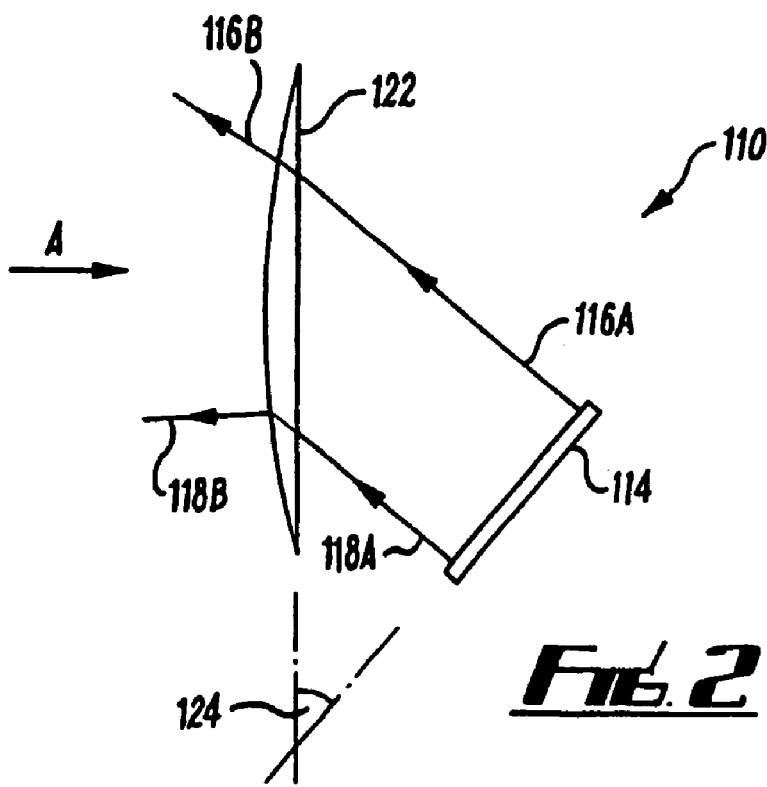
FIG. 2 is a diagrammatic side view of a second embodiment of the invention.

FIG. 2 shows in diagrammatic form a second embodiment of the invention. Imaging apparatus 110 includes an LCD screen 114 in communication with a controller (not shown). The LCD screen 114 creates an image which is projected as shown by arrowed lines 116A and 118A through an enlarging means in the form of a lens 122 for viewing by a viewer along a direction shown by arrow A. In this embodiment, the LCD screen 114 also forms the display screen. The lens 122 could be simple or compound, and could be translucent or transparent. As shown in FIG. 2, the LCD screen 114 could be orientated at a first angle 124 to the plane of the lens 122 in a similar way to that described for the embodiment shown in FIG. 1 to produce an enlarged image. However the lens 122 allows an enlarged image to be produced even if the screen 114 and the lens 122 are parallel.

As shown in FIG. 2, the lens 122 produces a divergent image as indicated by arrowed lines 116B, 118B, so that the size of the image viewed by the viewer depends upon the distance of the viewer from the lens 122 and also on the enlarging power of the lens 122.

FIGS. 3 and 4 show a third embodiment of the invention. Imaging apparatus 210 includes an LCD screen 214 on which a moving image is created, which is projected as shown by arrowed lines 216A, 218A onto a reflector 222 in the form of a mirror, which is orientated at a second angle 226 relative to the LCD screen 214. The reflector 222 reflects a divergent image as indicated by arrowed lines 216B, 218B onto a display screen 212 for viewing by a viewer in a direction shown by arrow A.

In this example, enlarging means are provided partly by the second angle of orientation 226 between the LCD screen 214 and the reflector 222. The reflector 222 is also orientated at a third angle 228 to the display screen 212, producing further enlargement of the image. The degree of enlargement of the image is determined in this example by a number of factors. In this example, the LCD screen 214, the reflector 222 and the display screen 212 are orientated at angles to each other in both the vertical plane as shown in FIG. 3 and the horizontal plane as shown in FIG. 4. Thus the degree of enlargement will be determined by the size of the second relative angle 226A in the vertical plane between the LCD screen 214 and the reflector 222, the size of the third angle 228A in the vertical plane between the reflector 222 and the display screen 212, the size of the second relative angle 226B in the horizontal plane between the LCD screen 214 and the reflector 222, and the size of the third relative angle 228B in the horizontal plane between the reflector 222 and the display screen 212. As with the first angle in the first embodiment, the second angle 226 and third angle 228 must be greater than 0° and less than 90° for enlargement.

Since as shown by arrowed lines 216B, 21 BB the image reflected by the reflector 222 is divergent, the degree of enlargement of the image at the display screen 212 will also be determined by the distance between the reflector 222 and the display screen 212. Thus the degree of enlargement possible in this example is greater, for instance, than that possible in the embodiment shown in FIG. 1 and described above, and the arrangement can be relatively more compact. Other features of the imaging apparatus 210 are similar to those described above for the previous embodiments, such as the provision of a programmable controller.

FIG. 5 shows a fourth embodiment of the invention. Imaging apparatus 310 includes an LCD screen 314 which projects an image as indicated by arrowed lines 316A, 318A onto a curved reflector 322 in the form of a mirror. The curved reflector 322 is convex and reflects a diverging image as indicated by arrowed lines 316B, 318B onto a display screen 312 for viewing by a viewer along a direction shown by arrow A.

In this example, enlarging means for enlarging the image are provided by a second relative angle of orientation 326 between the LCD screen and the plane of the curved reflector 322. The degree of enlargement is also determined by the distance between the reflector 322 and the display screen 312 and the degree of curvature of the reflector 322.

Further enlargement could also be provided by orientating the curved reflector 322 at an angle to the display screen 312. The LCD screen 314, the reflector 322 and the display screen 312 could also be orientated relative to each other in both the horizontal and vertical planes as shown in FIGS. 3 and 4.

The curved reflector 322 further increases the degree of enlargement possible, thus reducing the space requirements of the apparatus.

FIG. 6 shows a fifth embodiment of the invention. Imaging apparatus 410 includes an LCD screen 414 at which a moving image is created, the moving image as indicated by lines 416A, 418A being projected through a lens 432 to produce a divergent image as indicated by arrowed lines 416B, 418B. The divergent Image is projected onto a reflector 422 which reflects the divergent image as shown by arrowed lines 416C, 418C onto a display screen 412 for viewing by a viewer in a direction shown by arrow A.

In this embodiment, enlarging means are provided by the lens 432, a second relative angle 426 between the LCD screen 414 and the reflector 422, and a third relative angle 428 between the reflector 422 and the display screen 412. The degree of enlargement is determined by the size of the second and third angles 426, 428, the enlarging power of the lens 432, the distance of the lens 432 from the reflector 422, and the distance of the reflector 422 from the display screen 412.

The LCD screen 414 is in communication with a programmable controller 420, which Is programmable with a set of instructions to create the image in a similar manner to that described previously.

Figure 7:
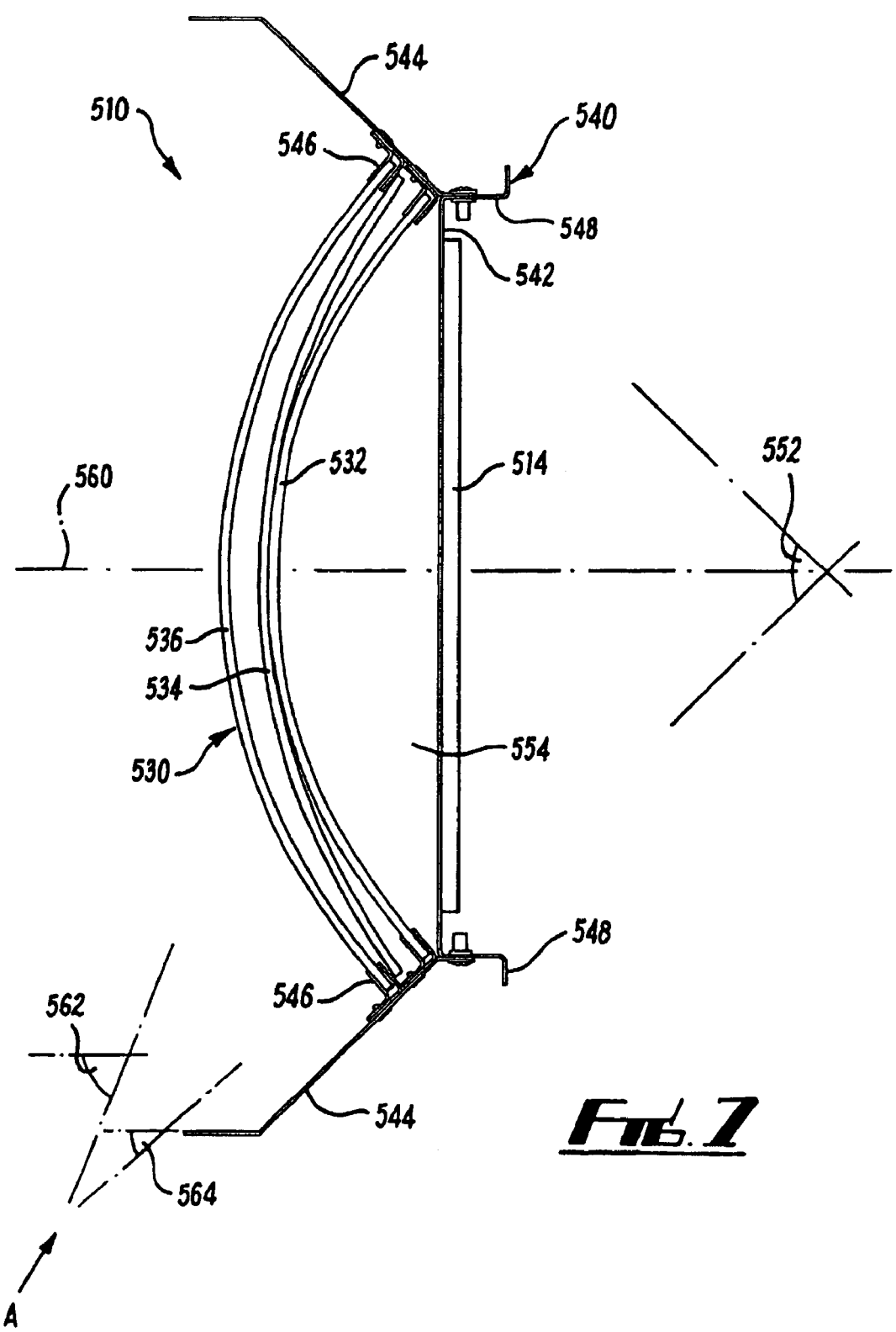
FIG. 7 is a plan view of a sixth embodiment of the invention.
Figure 8:
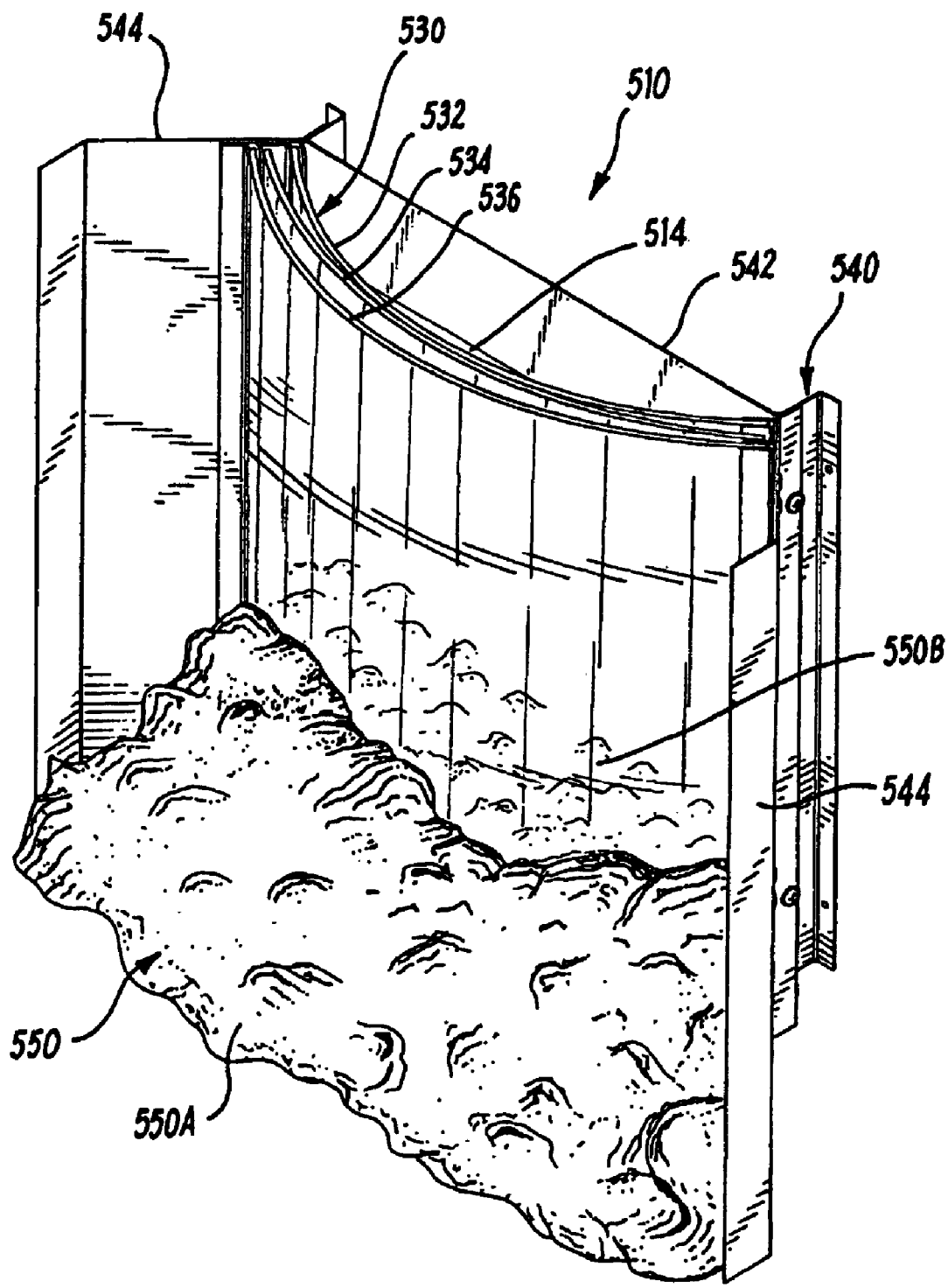
FIG. 8 is a perspective view of the embodiment shown in FIG. 7.

FIGS. 7 and 8 show a sixth embodiment of the invention. Imaging apparatus 510 includes an LCD screen 514 at which a moving image is created and which also forms the display screen, as in the embodiment shown in FIG. 2. The apparatus 510 includes enlarging means in the form of a lens arrangement 530, the lens arrangement 530 including, in this example, three Fresnel lenses: an inner lens 532 ("inner" relative to the LCD screen 514), a middle lens 534 and an outer lens 536. Each of the lenses 532, 534, 536 is curved when viewed in plan as shown in FIG. 7, the curve being concave relative to the LCD screen 514, each of the lenses 532, 534, 536 forming in plan an arc subtending a fourth angle 552. The fourth angle 552 could be an angle of between 60° and 100°, more preferably of between 80° and 95° and optimally of approximately 90°.

The lenses 532, 534, 536 could be concentric or nonconcentric. In the example shown in FIG. 7, the inner and outer lenses 532, 536 are concentric and the middle lens 534 is non-concentric with the inner and outer lenses 532, 536.

The LCD screen 514 and the lenses 532, 534, 536 are mounted to a housing 540. The housing 540 includes a screen mounting part 542 to which the LCD screen 514 is mounted, the screen mounting part 542 including a pair of bracket parts 548 which extend rearwardly in use of the LCD screen 514 to space the LCD screen 514 from a wall (not shown) to which the housing 540 may be mounted in use, thus allowing ventilation of the LCD screen 514. The housing 540 includes a pair of side walls 544, which extend forwardly on each side of the lenses 532, 534, 536. Channelling 546 extends inwardly from each of the side walls 544, defining channels in which ends of the lenses 532, 534, 536 are received.

The lens arrangement 530 is arranged to have the effect of a converging lens, with an effective focal length that is greater than the distance between the lens arrangement 530 and the LCD screen 514, so that the image seen by the viewer is a virtual image.

Virtual images occur when an object Is placed inside the focal length of a converging lens. The virtual image seen by the viewer is orientated in the same direction as the object and is enlarged, but such images are dependent upon the position of the viewer and move as the viewer moves. In one example in which a planar Fresnel lens is used, the virtual image appears to slide out of view as the viewer moves laterally relative to the LCO screen 514, increasing the viewing angle from the normal to the screen. Typically with a planar Fresnel lens, the virtual image becomes not visible to the viewer at a viewing angle to the normal of the screen 514 of more than 30°. This is a relatively small viewing angle and hence this arrangement is unsatisfactory for a fireplace.

By curving the Fresnel lens, the applicant has found that the range of viewing angles at which the virtual image is viewable is greatly increased. In the example shown in FIG. 7, a viewer, viewing along the direction shown by arrow A can view part of the image at a near side of the outer lens 536 at a fifth angle 564, which is an angle to the normal 560 of the screen 514, and another part of the image towards the middle of the outer lens 536 at a sixth angle 562 to the normal 560. The fifth angle 564 is similar in size to half of the fourth angle 552, and in the example shown in FIG. 7 is approximately 45°. The curved lenses 532, 534, 536 permit viewing of the image at values of the sixth angle 562 which are greater than otherwise, and could be up to 70°-80° from the normal 560.

The lenses used in the example shown in FIGS. 7 and 8 are Fresnel lenses, but any other suitable lenses could be used. Fresnel lenses have the advantage of being flexible, robust, relatively cheap and readily available. The Fresnel lenses could be formed of any suitable material. In one example, the Fresnel lenses used are formed of acrylic plastics material such as polymethylmethacrylate (PMMA). Fresnel lenses have a smooth face and a grooved face, and in the examples shown in FIGS. 7 and 8 the grooved face of each of the lenses 532, 534, 536 faces the viewer. The lens arrangement 530 could include any suitable number of Fresnel lenses, of any suitable specification.

FIG. 8 shows the imaging apparatus 510 of FIG. 7 with a fuel effect member 550, which could have the appearance of pieces of coal, logs, embers or pebbles or any other suitable appearance, and could be translucent and illuminated. Part of the fuel effect member 550A extends forwardly of the lenses 532, 534, 536 and part of the fuel effect member 550B is located in a lower part of a region 554 between the lenses 532, 534, 536 and the LCD screen 514. In use, the flame image thus appears to rise out of the fuel effect member 550. The curved lenses 532, 534, 536 have been found to produce a three dimensional effect so that the flame images appear to rise out of the fuel effect member 550 as a whole rather than from any specific part. In this respect, the moving characteristic of virtual images is utilised to increase the realism, since as the viewer moves, the images also move, and because of the curved lenses, the images appear to move three dimensionally.

Traditionally, fireplaces include apertures approximately 400 mm wide and 200 mm deep to receive fires of standard design. However, modem houses commonly do not provide traditional fireplaces, but may only include mantelpieces of relatively shallow depth for decorative effect only. Such decorative fireplaces may only permit the use of fires having a depth of approximately 100 mm. The imaging apparatus 510 as shown in FIGS. 7 and 8 has the considerable advantage of having a relatively shallow depth while providing a realistic moving flame image, which is enlarged for viewing by viewers with a good range of viewing angles. The imaging apparatus 510 is quiet and compact. As described above, in relation to the embodiment shown in FIG. 1, the images could be varied by a user by downloading suitable image files from the Internet to a communications port of the controller.

In one example, the LCD screen 510 is approximately 250 mm wide, the overall width of the housing 540 being approximately 400 mm. The inner, middle and outer lenses 532, 534, 536 have radii of approximately 195 mm, 232 mm and 212 mm respectively, the middle lens 534 not being concentric with the inner and outer lenses 532, 536. The midpoint of the outer lens 536 projects approximately 70 mm forward of the LCD screen 514 and the housing 540 has a maximum depth of approximately 100 mm. In this example, the Fresnel lenses 532, 534, 536 each have an effective focal length of approximately 1300 mm, with approximately 3.3 grooves per mm and a thickness at the centre of 2 mm.

Various modifications may be made without departing from the scope of the invention. Any suitable image creating means could be used. The image creating screen could be a cathode ray tube (CRT) screen or a plasma screen. The image creating means could comprise a projector.

The apparatus could include any of the combinations of image creating means, enlarging means and display screen as appropriate, examples of which have been given in the above embodiments. The display screen could be non-planar. The image creating means, the enlarging means and the display screen could be orientated at any combination of the orientation angles in the horizontal and vertical planes, examples of which have been given in the embodiments above. Any suitable programmable controller could be used with any suitable set of instructions for creating a moving image.

There is thus provided imaging apparatus, which allows the creation of relatively complex realistic moving images to be provided economically, quietly and compactly in an apparatus suitable for use in a domestic fire.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. Imaging apparatus for a heating appliance, the imaging apparatus including image creation means for creating a moving image, means for enlarging the image, and a display screen for displaying the image in use to a viewer, the image creation means including a substantially planar image creation screen on which the image is created, the image creation screen comprising the display screen, the enlarging means including a lens arrangement which includes at least one lens, the or each lens being in the form of a Fresnel lens, in which the lens arrangement has the effect of a converging lens, having an effective focal length that is greater than the distance between the lens arrangement and the image creation means, so that the image seen by the viewer is a virtual image, and wherein the or each Fresnel lens is curved concavely when viewed in plan in use relative to the image creation means.

2. Apparatus according to claim 1, in which the image creation screen is in the form of a liquid crystal display (LCD) screen.

3. Apparatus according to claim 1, in which the or each curved lens forms an arc in plan in use which subtends an angle between of between 60° and 100°.

4. Apparatus according to claim 1, in which the image creation means includes a controller which is programmable with a set of instructions.

5. A heating appliance including imaging apparatus according to claim 1.

* * * * *